No. 842,413. PATENTED JAN. 29, 1907.
R. A. MILLER.
ELECTROMAGNETIC POWER GENERATOR.
APPLICATION FILED MAR. 14, 1906.

4 SHEETS—SHEET 1.

Witnesses
Vernon Plummer
Thomas H. McMeans

Inventor
Reinhold A Miller

By
Bradford & Hood,
Attorneys

No. 842,413. PATENTED JAN. 29, 1907.
R. A. MILLER.
ELECTROMAGNETIC POWER GENERATOR.
APPLICATION FILED MAR. 14, 1906.
4 SHEETS—SHEET 2.
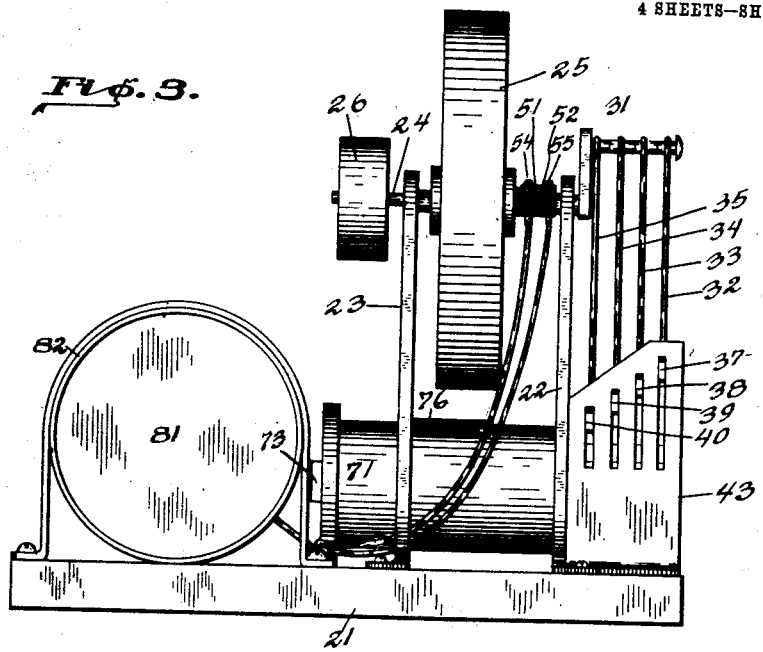
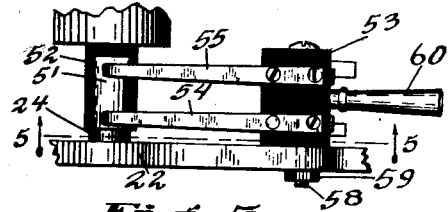
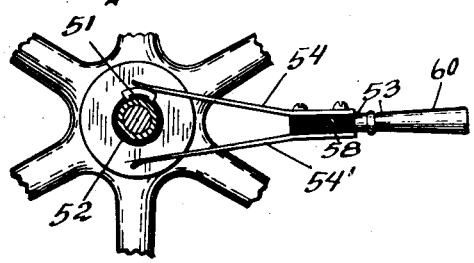
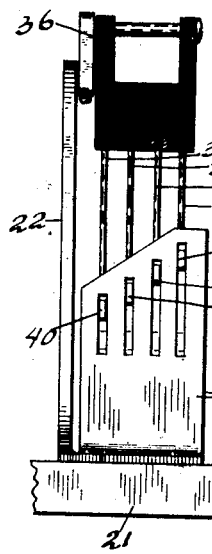
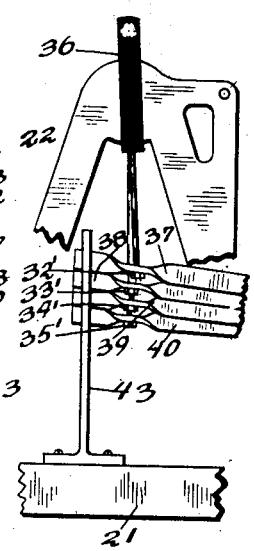
Witnesses
Vernon Plummer
Thomas W. McMeans
Inventor
Reinhold A. Miller
By Bradford & Hood,
Attorneys No. 842,413. PATENTED JAN. 29, 1907.
R. A. MILLER.
ELECTROMAGNETIC POWER GENERATOR.
APPLICATION FILED MAR. 14, 1906.
4 SHEETS—SHEET 3.
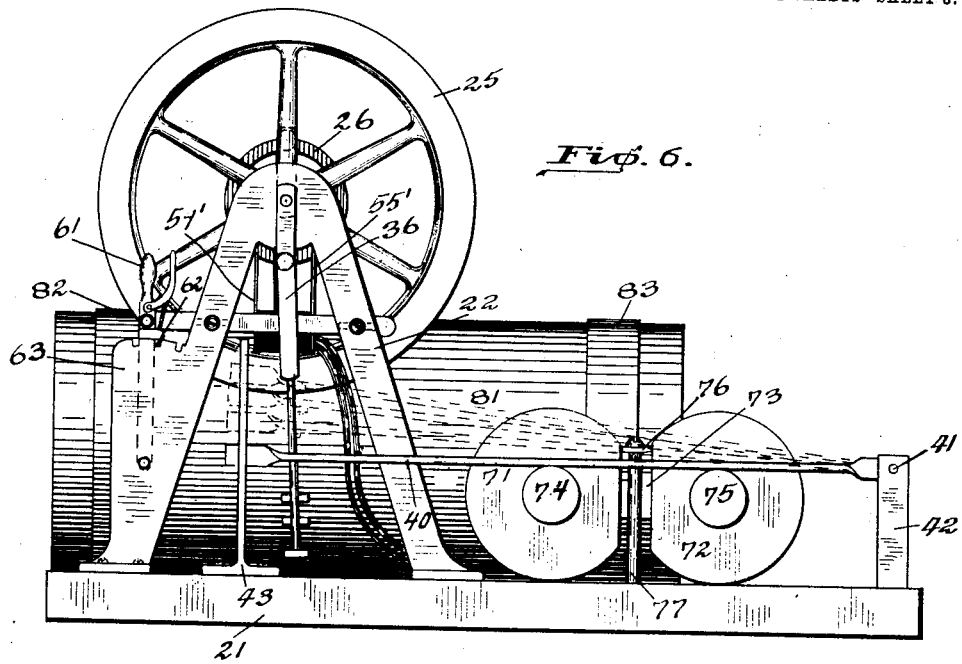
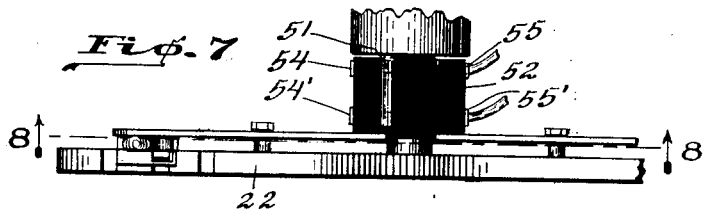
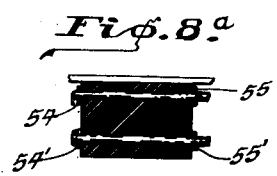
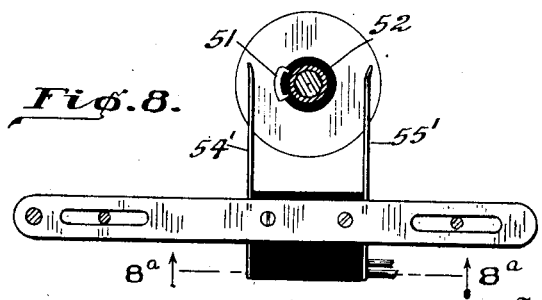
Witnesses
Vernon Plummer.
Thomas W. McMeans
Inventor
Reinhold A. Miller.
By Bradford & Hood,
Attorneys No. 842,413. PATENTED JAN. 29, 1907.
R. A. MILLER.
ELECTROMAGNETIC POWER GENERATOR.
APPLICATION FILED MAR. 14, 1906.
4 SHEETS—SHEET 4.
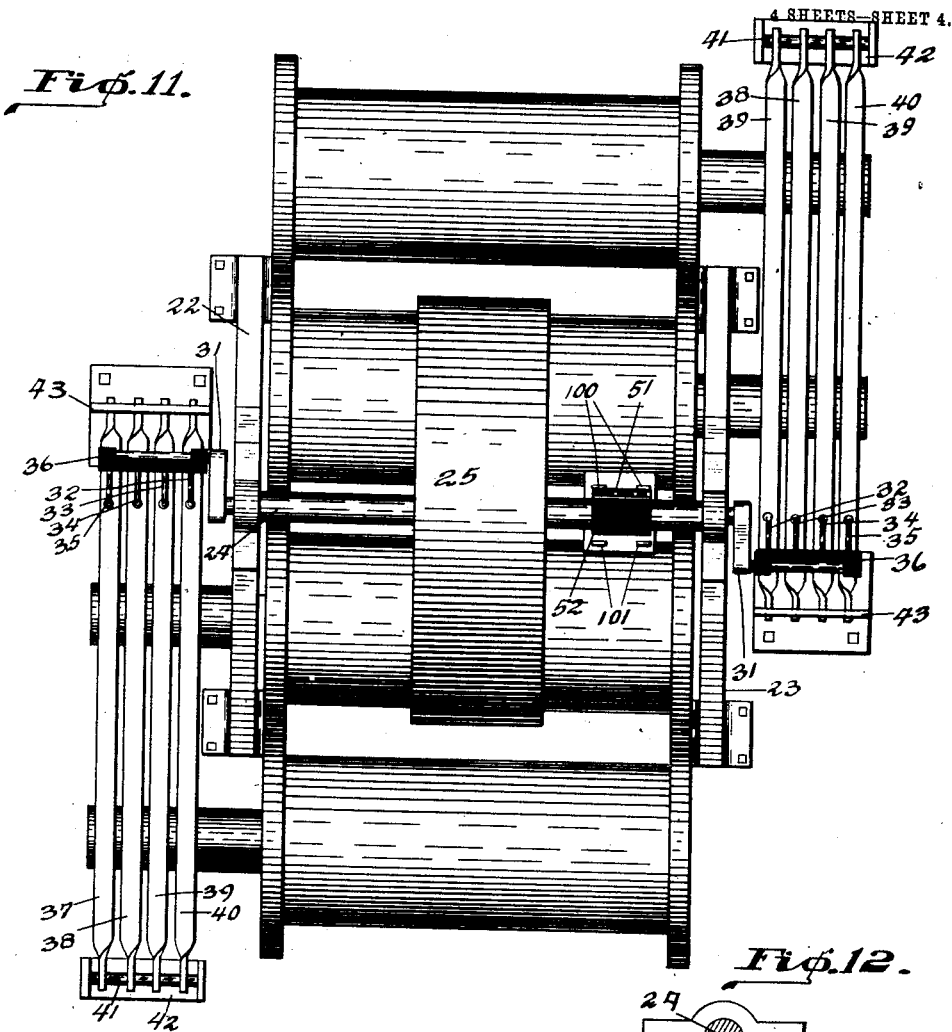
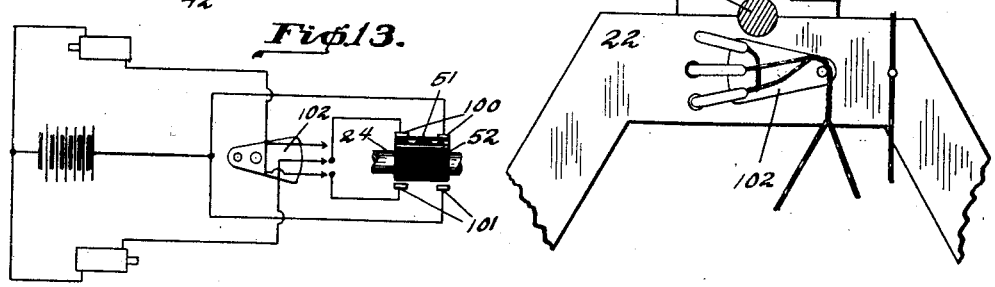
Witnesses
Vernon Plummer.
Thomas W. McMeans.
Inventor
Reinhold A. Miller.
By Bradford Hood
Attorneys

UNITED STATES PATENT OFFICE.

REINHOLD A. MILLER, OF INDIANAPOLIS, INDIANA.

ELECTROMAGNETIC POWER-GENERATOR.

No. 842,413.　　　Specification of Letters Patent.　　　Patented Jan. 29, 1907.

Application filed March 14, 1906. Serial No. 305,950.

*To all whom it may concern:*

Be it known that I, REINHOLD A. MILLER, a citizen of the United States, residing at Indianapolis, in the county of Marion and State of Indiana, have invented certain new and useful Improvements in Electromagnetic Power-Generators, of which the following is a specification.

My present invention consists in an improved electromagnetic power-generator, and has for its object the simplification of the mechanism and an increase of efficiency.

Figure 1:
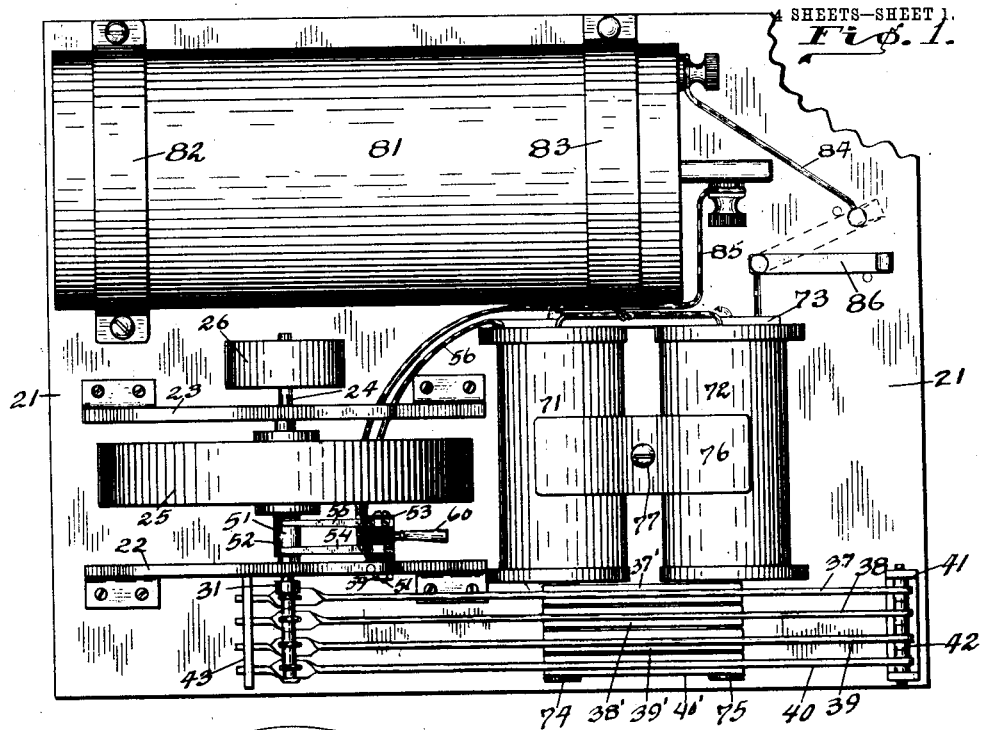
Figure 2:
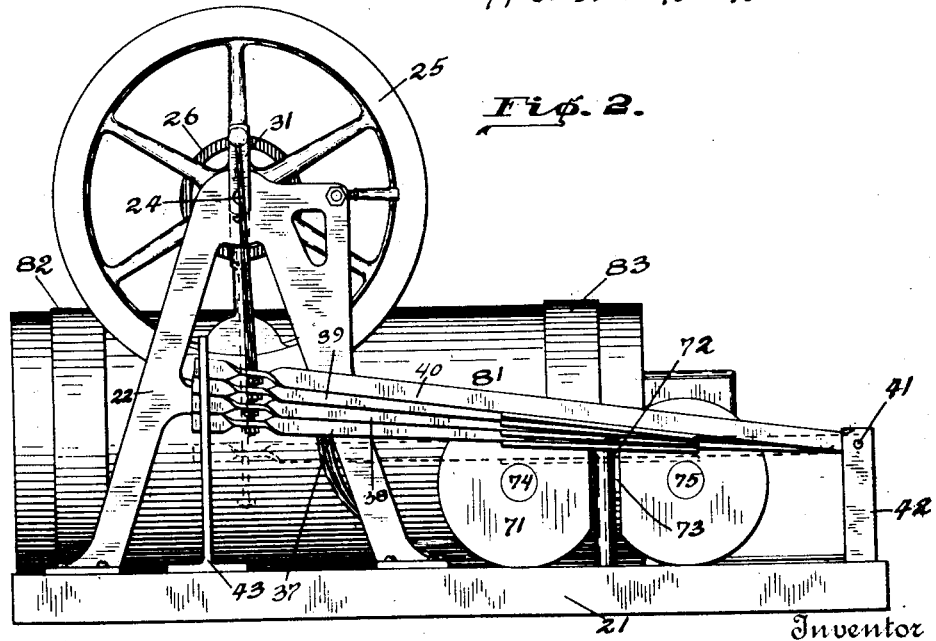

Referring to the accompanying drawings, which are made a part hereof, and on which similar reference characters indicate similar parts, Figure 1 is a top or plan view of an electromagnetic power-generator of the character in question embodying my present invention; Fig. 2, a side elevation thereof; Fig. 3, an end elevation; Fig. 4, a top or plan view of the brushes and rotating contact on an enlarged scale; Fig. 5, a detail sectional view on line 5 5 in Fig. 4; Fig. 6, a side elevation in many respects similar to Fig. 2, but illustrating an alternative construction of some of the parts and also illustrating the position which the crank, pitman, and armature-carrying bars occupy when the armatures are at the extreme of their strokes; Fig. 7, a top or plan view of the brushes, armature, and immediately-adjacent parts when constructed as in Fig. 6; Fig. 8, a sectional elevation on line 8 8 in Fig. 7 with some parts broken away to show the construction more clearly; Fig. 8ª, a detail of parts shown in Fig. 8; Fig. 9, a fragmentary end elevation, showing the pitman construction of Fig. 6, but with the crank in its upper position; Fig. 10, a side elevation of the same parts shown in Fig. 9; Fig. 11, a plan of a double construction; Fig. 12, a side elevation of the reversing-switch in the construction shown in Fig. 11, and Fig. 13 a diagram of the wiring of said construction.

In my improved machine I have shown a single base 21, upon which the several parts of the apparatus are mounted. Two A-shaped frames 22 and 23 carry the shaft 24 which is to be driven, and upon this shaft I preferably mount a fly-wheel 25, and said shaft may also, if desired, be provided with a pulley 26, from which any desired machine may be driven. Upon one end of the shaft 24 is a crank 31, and this is connected by a series of pitmen, as 32, 33, 34, and 35, to a corresponding series of vibrating armature-carrying bars 37, 38, 39, and 40. These bars in the construction shown in Figs. 1, 2, and 3 may be either of wood or other insulating material or of diamagnetic metal, in which case they are provided at points adjacent the poles of the magnets with armatures 37', 38', 39', and 40', so that said electromagnets when energized may exert a pulling force thereon. As shown in Fig. 6, the bars may be made of magnetic metal, thus avoiding the necessity of separate armatures; but in such case I prefer to make the pitmen of a non-magnetic material. Such a form is shown in Figs. 6, 9, and 10, where the upper part of the pitmen consists of a block 36 of insulating material, which I consider to be a desirable construction. The vibrating armature-bars are pivoted, as at 41, to a suitable frame part 42 and passed close to the projecting poles of the electromagnets, as will presently be described. They are guided and limited in their movement by a suitable guide 43, as best shown in Fig. 3, containing a guideway for each of the armature-arms, by means of which said arms are guided in their up-and-down movement and kept in their proper relation to each other.

The pitmen 32, 33, 34, and 35 are of varying lengths and are so connected to the armature-arms that they are permitted a greater movement than said arms themselves. As said arms stop at a uniform point, where they most closely approach the poles of the magnet, and as the pitmen are permitted to travel farther and are of differing lengths, the result is that said armature-arms are lifted successively by said pitmen as they rise, so that each is started away from the electromagnetic cores at a different time from any other. On the return movement each of them also reaches its lowest position at a different time from any of the others, so that the effective pull of the magnets on the armature is distributed over a greater period of time and a greater portion of the revolution of the crank than would otherwise be the case, and the power of the cranks is thus more effectively applied to produce rotation of the shaft. The amount of effective pull which can be exerted upon the crank when its wrist-pin is nearing its lowest point is comparatively little, and therefore it is hardly worth while to attempt to exert power upon the wrist-pin clear to its lowest point. Under these circumstances all of the pitmen 32, 33, 34, and 35 must have a sliding connection, either with the wrist-pin or through the levers; but if it is desired to apply power to the very limit of the movement of the wrist-pin one of the pitmen may have a non-sliding connection, as will be readily apparent.

As already indicated, the pitmen may be constructed as most clearly shown in Figs. 2 and 3, each extending from the corresponding armature-carrying bar to the crank-pin, or they may be constructed as shown in Figs. 6, 9, and 10, extending one from each of the armature-carrying bars to a single member or block, and in the latter case this block or intermediate part may be composed of insulating material. The lower ends of said pitmen pass through holes in the armature-bars or are otherwise so connected as to have a movement in excess of that of said bars, as before stated. They are provided (see Fig. 10) with nuts 32', 33', 34', and 35', by means of which the connection is rendered adjustable and whereby a means of easily disconnecting the pitmen and bars is also provided. Shaft 24 is provided with an insulator portion 52, which carries a connecting-contact 51, adapted to intermittently engage and connect a pair of brush-terminals 54 and 55, carried by a pivoted brush-block 53.

It is desirable to have a provision by means of which the shaft may be driven in either direction. I therefore make my brush a double brush (that is, I provide a second set of brush-arms 54' and 55') and either mount the brush as a whole on a pivot 58, as best shown in Fig. 5, so that by rocking the brush structure on this pivot I can position it so that either the upper or lower set of brush-arms 54 and 54' or 55 and 55' will come in contact with the commutator, or mount it slidably, as shown in Figs. 6, 7, and 8, which produce the same result. The latter form I regard as preferable for some reasons, as I can control it by means of a lever 61, a latch 62, and a notched quadrant 63. The quadrant is provided with three notches, the end ones of which hold the respective sets of brush-arms into contact with the commutator, while the middle one holds it free from both. With this construction a switch in the battery connections becomes unnecessary, as by engaging the latch with the middle notch of the quadrant the brushes and commutators are separated and the electrical circuit is thus broken as effectually as by a separate switch. It will be readily understood that brushes 54 and 54' are connected together and brushes 55 and 55' are similarly connected, so as to reverse the direction of current in a well-known manner. As the commutator embodies only a single piece of metal or conducting material, it is obvious that when the set of brushes on one side are adjusted to come into contact therewith the effect will be to rotate the shaft in one direction, while when the brush structure is so adjusted that this set of brushes is separated from the commutator and the other set brought into contact therewith the result will be to rotate the shaft in the opposite direction. When the brushes are adjusted to the desired position in the construction shown in Figs. 4 and 5, they may be secured in such position by any suitable means, as by tightening a jam-nut 59 on the pivot 58. In this construction a handle 60 is provided as a means of convenient manipulation.

The electromagnet is shown as composed of two ordinary spools 71 and 72, connected by a bar 73 and having their cores or poles 74 and 75 projecting a sufficient distance to cross the paths of the armature-carrying arms. These magnets are substantially of an ordinary and well-known form except that these cores or pole-pieces are preferably somewhat larger and project some farther than is common. This structure is shown as secured to the base 21 by a clamp-bar 76 and screw 77.

As the source of electrical energy I have shown a single cell of dry battery 81, which is also secured to the base 21 by bands 82 and 83 or in any other suitable or desired manner. This battery is suitably connected on one side to one end of the magnet-coils by wire 84 and on the other side to the brushes 54 and 54' by wire 85. A wire 56 connects the other end of the magnet-coils with the brushes 55 and 55'. In Fig. 1 I have shown a switch 86 interposed in one of these wires for convenience in throwing the current on and off. As before stated, however, this switch is unnecessary, especially where the construction in Figs. 6, 7, and 8 is employed.

In Figs. 11, 12, and 13 I show a double construction, in which the shaft is provided with two cranks one hundred and eighty degrees apart. Each crank is provided with a set of actuators armature-arms and each set of armature-arms is acted upon by an independent magnet, the magnets being successively energized and deënergized by the alternate engagement of the rotating contact 51 with one or the other of the parts of brushes 100 and 101. In order to obtain a reverse rotation of the shaft, I provide a switch 102, by means of which, as is clearly indicated in Fig. 12, the two sets of magnets may be alternately connected with either set of brushes.

It will be readily understood that as many cranks and sets of actuators may be provided as may be desired without departing from my invention.

I claim as my invention—

1. The combination, in an electromagnetic power-generator, of a suitable source of electrical energy, an electromagnet having a projecting core or pole, a shaft, a crank on said shaft, a series of armature-bars pivoted at one end and extending across the poles or cores of the magnets, and a corresponding series of pitmen of differing lengths connecting said armature-bars and the crank on the shaft.

2. The combination, in an electromagnetic power-generator, of an electromagnet having a projecting core or pole, a shaft, a crank on said shaft, a series of armature-bars pivoted at one end and extending across the poles or cores of the magnets, and a corresponding series of pitmen of differing lengths connecting said armature-bars and the crank on the shaft.

3. The combination, in an electromagnetic power-generator, of a suitable source of electrical energy, an electromagnet, a shaft, a crank on said shaft, vibrating armatures connected to said crank, a commutator on said shaft and a double brush mounted adjacent said commutator and electrically connected to the magnet, and means for bringing either set of brushes into effective condition for the magnet to reverse the direction of rotation of the shaft.

4. The combination, in an electromagnetic power-generator, of an electromagnet, a shaft, a crank on said shaft, vibrating armatures connected to said crank, a commutator on said shaft and a double brush mounted adjacent said commutator and electrically connected to the magnet, and means for bringing either set of brushes into effective condition for the magnet to reverse the direction of rotation of the shaft.

5. The combination, in an electromagnetic power-generator, of a shaft, a crank on said shaft, a plurality of vibrating armatures each having an independent sliding connection with the crank limiting the period of its action on said crank, an electromagnet common to said armatures for moving the armatures in one direction, and means operated by the shaft for controlling said electromagnet.

6. The combination, in an electromagnetic power-generator, of a shaft, a crank on said shaft, a plurality of vibrating armatures each having an independent sliding connection with the crank limiting the period of its action on said crank, an electromagnet common to said armatures for moving the armatures in one direction, and means for controlling said electromagnet.

7. The combination, in an electromagnetic power-generator, of a shaft, a crank on said shaft, a plurality of vibrating armatures and an independent pitman connection between each of said vibrating armatures and the crank, said pitmen having sliding engagements with their armatures, means for limiting the vibratory movement of said armatures, an electromagnet arranged to affect the armatures, and means operated by the shaft for controlling said electromagnet.

8. The combination, in an electromagnetic power-generator, of a shaft, a crank on said shaft, a plurality of vibrating armatures and an independent pitman connection between each of said vibrating armatures and the crank, said pitmen having sliding engagements with their armatures, means for limiting the vibratory movement of said armatures, an electromagnet arranged to affect the armatures, and for controlling said electromagnet.

9. The combination, in an electromagnetic power-generator, of a shaft, a crank on said shaft, a plurality of vibrating armatures, an electromagnet affecting said armatures, a plurality of independent connections between said armatures and the crank, which embody a slip joint, and means operated by the shaft for controlling said electromagnet.

10. The combination, in an electromagnetic power-generator, of a shaft, a crank on said shaft, a plurality of vibrating armatures, an electromagnet affecting said armatures, a plurality of independent connections between said armatures and the crank, which embody a slip joint, and means for controlling said electromagnet.

11. The combination, in an electromagnetic power-generator, of a shaft, a crank on said shaft, a plurality of vibrating armatures, an electromagnet affecting said armatures, a plurality of independent connections between said armatures and the crank, which embody a slip joint, means operated by the shaft for controlling said electromagnet, and means for limiting the movement of the vibrating armatures in the direction effected by the magnet.

12. The combination, in an electromagnetic power-generator, of a shaft, a crank on said shaft, a plurality of vibrating armatures, an electromagnet affecting said armatures, a plurality of independent connections between said armatures and the crank, which embody a slip joint, means for controlling said electromagnet, and means for limiting the movement of the vibrating armatures in the direction effected by the magnet.

13. The combination, in an electromagnetic generator, of a shaft, a pair of cranks on said shaft, two sets of vibrating armatures, one for each crank, a pair of electromagnets, one for each set of armatures, means operated by the shaft for intermittently connecting and disconnecting the two magnets successively with an energizing-circuit, and means for reversing the succession to reverse the direction of rotation of the shaft.

14. The combination, in an electromagnetic generator, of a shaft, a pair of cranks on said shaft, two sets of vibrating armatures, one for each crank, a pair of electromagnets, one for each set of armatures, means for intermittently connecting and disconnecting the two magnets successively with an energizing-circuit, and means for reversing the succession to reverse the direction of rotation of the shaft.

15. The combination, in an electromagnetic power-generator, of a shaft, a crank on said shaft, a plurality of vibrating armatures, a plurality of independent sliding pitmen connecting the armatures with the crank, an electromagnet common to all the armatures for effecting said armatures, and means for automatically controlling said magnet.

In witness whereof I have hereunto set my hand and seal, at Indianapolis, Indiana, this 10th day of March, A. D. 1906.

REINHOLD A. MILLER. [L. S.]

Witnesses:
 REINHOLD A. MILLER, Jr.,
 THOMAS W. MCMEANS.